US009858438B2

(12) United States Patent
Rueger et al.

(10) Patent No.: US 9,858,438 B2
(45) Date of Patent: Jan. 2, 2018

(54) MANAGING DIGITAL PHOTOGRAPH METADATA ANONYMIZATION

(71) Applicant: International Business Machines Corporation, Armonk, NY (US)

(72) Inventors: Erik Rueger, Ockenheim (DE); Tim U. Scheideler, Schoenenberg (CH); Thomas A. Snellgrove, Wakefield, MA (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 14/669,439

(22) Filed: Mar. 26, 2015

(65) Prior Publication Data
US 2016/0283743 A1    Sep. 29, 2016

(51) Int. Cl.
*G06F 21/62* (2013.01)

(52) U.S. Cl.
CPC .................. *G06F 21/6254* (2013.01)

(58) Field of Classification Search
CPC .......... G06F 21/30; G06F 21/31; G06F 21/60; G06F 21/604; G06F 21/62; G06F 21/6218; G06F 21/6245; G06F 21/6254
See application file for complete search history.

(56) References Cited

U.S. PATENT DOCUMENTS

| 8,121,342 | B2 | 2/2012 | Davis et al. | |
| 8,687,018 | B1 * | 4/2014 | Stout | G06F 17/5004 345/619 |
| 2002/0088000 | A1 * | 7/2002 | Morris | H04N 1/00132 725/105 |
| 2003/0063770 | A1 * | 4/2003 | Svendsen | G06F 17/30206 382/100 |
| 2004/0249768 | A1 * | 12/2004 | Kontio | G06F 21/10 705/65 |
| 2004/0268251 | A1 * | 12/2004 | Sadovsky | H04N 1/00204 715/273 |
| 2005/0154695 | A1 * | 7/2005 | Gonzalez | G06F 17/30306 |

(Continued)

OTHER PUBLICATIONS

Henne et al., "Short Paper: On the Awareness, Control and Privacy of Shared Photo Metadata", Distributed Computing & Security Group, Leibniz Universitt Hannover, Germany, noted by Inventor in Main Idea dated Nov. 20, 2014, <http//fc14.ifca.ai/papers/fc14_submission_117.pdf>.

(Continued)

*Primary Examiner* — Eric W Shepperd
(74) *Attorney, Agent, or Firm* — Stephanie L. Carusillo

(57) ABSTRACT

An approach for managing photograph metadata anonymization is provided. The approach receives, by one or more processors, a photograph file, wherein the photograph file comprises a digital photograph and a first metadata. The approach receives, by one or more processors, a rule set for modifying the first metadata. The approach determines, by one or more processors, whether at least one rule of the rule set corresponds to a datum of the first metadata. Responsive to determining at least one rule corresponds to at least one datum of the first metadata, the approach modifies, by one or more processors, the first metadata based on the rule set to create a second metadata. The approach stores, by one or more processors, the first metadata in a database.

20 Claims, 3 Drawing Sheets

(56) References Cited

U.S. PATENT DOCUMENTS

| | | | |
|---|---|---|---|
| 2006/0056625 | A1 | 3/2006 | Nakabayashi et al. |
| 2006/0129599 | A1* | 6/2006 | Hammerich ............ G06F 8/437 |
| 2006/0221190 | A1* | 10/2006 | Limberis ........... G06F 17/30056 348/207.1 |
| 2007/0169065 | A1* | 7/2007 | Janson ................ G06F 9/44505 717/162 |
| 2008/0075395 | A1 | 3/2008 | Wallace et al. |
| 2008/0133539 | A1* | 6/2008 | Kaarela ................... G06F 21/10 |
| 2009/0043637 | A1* | 2/2009 | Eder ..................... G06Q 10/067 705/35 |
| 2010/0049502 | A1* | 2/2010 | Oppenheim ........ H04M 3/4931 704/9 |
| 2011/0055176 | A1* | 3/2011 | Choi .................. H04N 7/17318 707/694 |
| 2011/0129120 | A1 | 6/2011 | Chan |
| 2011/0222746 | A1* | 9/2011 | Kotula .................. G06F 19/322 382/128 |
| 2011/0254687 | A1 | 10/2011 | Arponen et al. |
| 2011/0292231 | A1* | 12/2011 | Winters ............ G06F 17/30265 348/222.1 |
| 2012/0078898 | A1 | 3/2012 | Kononenko et al. |
| 2012/0110323 | A1 | 5/2012 | Colclasure et al. |
| 2013/0036364 | A1 | 2/2013 | Johnson |
| 2013/0073574 | A1* | 3/2013 | Jin ..................... G06F 17/30563 707/756 |
| 2013/0088616 | A1* | 4/2013 | Ingrassia, Jr. .......... H04N 5/772 348/231.5 |
| 2013/0117847 | A1* | 5/2013 | Friedman .............. H04L 63/102 726/22 |
| 2013/0191922 | A1* | 7/2013 | Rigas ...................... G06F 21/60 726/26 |
| 2015/0019549 | A1 | 1/2015 | Johnson |
| 2015/0035999 | A1 | 2/2015 | Shehane et al. |
| 2015/0169306 | A1* | 6/2015 | Labocki .................... G06F 8/60 717/176 |
| 2016/0065627 | A1 | 3/2016 | Pearl et al. |
| 2016/0149862 | A1* | 5/2016 | Kilgallon ............ H04L 63/0245 726/11 |
| 2016/0170583 | A1* | 6/2016 | Heics .................. G06F 3/04842 715/811 |
| 2016/0226854 | A1* | 8/2016 | Chen ..................... H04L 63/083 |

OTHER PUBLICATIONS

"Adobe Photoshop File Info", Photo Meta Data.org, pp. 1-3, printed on Apr. 23, 2015, <http://www.photometadata.org/meta-tutorials-adobe-photoshop>.

"Certificate, Key, and Trust Services Programming Guide", Introduction, pp. 1-2, Copyright © 2003, 2013 Apple Inc., <https://developer.apple.com/library/mac/documentation/Security/Conceptual/CertKeyTrustProgGuide/01introduction/introduction.html#//apple_ref/doc/uid/TP40001358>.

"Controlled Vocabulary, one thing leads to another", The IPTC-NAA standards, pp. 1-6, printed on Apr. 23, 2015, <http://www.controlledvocabulary.com/imagedatabases/iptc_naa.html>.

"Encrypting and Hashing Data", Copyright © 2014 Apple Inc., pp. 1-4, <https://developer.apple.com/library/mac/documentation/Security/Conceptual/cryptoservices/GeneralPurposeCrypto/GeneralPurposeCrypto.html#//apple_ref/doc/uid/TP40011172-CH9-SW1>.

"Extensible Metadata Platform (XMP)", Copyright © 2015 Adobe Systems Incorporated, pp. 1-2, <http://www.adobe.com/products/xmp.html>.

"Guide to Photo Metadata Fields", Photo Meta Data.org, pp. 1-11, Printed on Apr. 23, 2015, <http://www.photometadata.org/meta-resources-field-guide-to-metadata>.

"IPTC Information Interchange Model", From Wikipedia, the free encyclopedia, pp. 1-3, This page was last modified on Jul. 22, 2014, <https://en.wikipedia.org/wiki/IPTC_Information_Interchange_Model>.

"Photo Metadata", Oct. 2014, IPTC Information Technology for News, IPTC Standard, IPTC Core, Specification Version 1.2, IPTC Extension, Specification Version 1.2, Document Revision 3, Copyright © 2015, International Press Telecommunications Council, pp. 1-74, <http://www.iptc.org/std/photometadata/specification/IPTC-PhotoMetadata>.

"Transmitting Data Securely", Cryptographic Services Guide, pp. 1-4, Copyright © 2014 Apple Inc., <https://developer.apple.com/library/mac/documentation/Security/Conceptual/cryptoservices/SecureNetworkCommunicationAPIs/SecureNetworkCommunicationAPIs.html#//apple_ref/doc/uid/TP40011172-CH13-SW1>.

IBM, Appendix P: List of IBM Patents or Patent Applications Treated as Related, dated Dec. 6, 2016, 2 pages.

Rueger et al, "Photograph Metadata Encryption", U.S. Appl. No. 14/831,970, filed Aug. 21, 2015, 29 pages.

* cited by examiner

US 9,858,438 B2

MANAGING DIGITAL PHOTOGRAPH METADATA ANONYMIZATION

TECHNICAL FIELD

The present invention relates generally to the field of managing metadata and, more particularly, to managing metadata associated with a digital photograph.

BACKGROUND OF THE INVENTION

Photograph metadata is data that has been written into a digital photograph file. Multiple photographic metadata standards exist and each include different sets of data written to the photograph. Data written to the photographs may include, but is not limited to, an owner of the photograph, copyright information, contact information for the photograph owner, a camera serial number, exposure information, and GPS location indicating where the photograph was taken. Some new technologies may identify the people in the photographs and include the names of those photographed in the metadata.

Metadata maintained with the digital photograph file can be accessed and read by most computing devices. Photographs uploaded to websites, including social media platforms, may maintain the metadata written to the digital photograph file by the camera. The rise of photograph sharing via social media has revealed a privacy concern for users who are unaware of what information is shared when the photograph is published.

Metadata may be removed from digital photograph files by some social media platforms. Once the metadata is removed from the photograph by the social media platform the metadata cannot be retrieved for that file. Unless a secondary copy of a digital photograph file is maintained by the user, the metadata can be lost.

SUMMARY

Aspects of the present invention provide an approach for managing photograph metadata anonymization, in accordance with an embodiment of the present invention. In one aspect a method includes receiving, by one or more processors, a photograph file, wherein the photograph file comprises a digital photograph and a first metadata. The method includes receiving, by one or more processors, a rule set for modifying the first metadata. The method includes determining, by one or more processors, whether at least one rule of the rule set corresponds to a datum of the first metadata. The method includes responsive to determining that at least one rule of the rule set corresponds to at least one datum of the first metadata, modifying, by one or more processors, the first metadata based on the rule set to create a second metadata. The method includes storing, by one or more processors, the first metadata in a database.

In another aspect, a computer program product includes program instructions to receive a photograph file, wherein the photograph file comprises a digital photograph and a first metadata. The program instructions include program instructions to receive a rule set for modifying the first metadata. The program instructions include program instructions to determine whether at least one rule of the rule set corresponds to a datum of the first metadata. The program instructions include responsive to determining that at least one rule of the rule set corresponds to at least one datum of the first metadata, program instructions to modify the first metadata based on the rule set to create a second metadata. The program instructions include program instructions to store the first metadata in a database.

In yet another aspect, a computer system includes program instructions to receive a photograph file, wherein the photograph file comprises a digital photograph and a first metadata. The program instructions include program instructions to receive a rule set for modifying the first metadata. The program instructions include program instructions to determine whether at least one rule of the rule set corresponds to a datum of the first metadata. The program instructions include, responsive to determining that at least one rule of the rule set corresponds to at least one datum of the first metadata, program instructions to modify the first metadata based on the rule set to create a second metadata. The program instructions include program instructions to store the first metadata in a database.

In yet another aspect, a method for deploying a system for managing photograph metadata anonymization includes providing a computer infrastructure being operable to receive, by one or more processors, a photograph file, wherein the photograph file comprises a digital photograph and a first metadata. The method includes providing a computer infrastructure being operable to receive, by one or more processors, a rule set for modifying the first metadata. The method includes providing a computer infrastructure being operable to determine, by one or more processors, whether at least one rule of the rule set corresponds to a datum of the first metadata. The method includes providing a computer infrastructure being operable to, responsive to determining that at least one rule of the rule set corresponds to at least one datum of the first metadata, modify, by one or more processors, the first metadata based on the rule set to create a second metadata. The method includes providing a computer infrastructure being operable to store, by one or more processors, the first metadata in a database.

DETAILED DESCRIPTION

Embodiments of the present invention recognize that metadata associated with a digital photograph file is both useful and poses a security risk if not regulated. Security risks arise from the information shared, such as GPS location, identities of people in the photograph, or a thumbnail picture of a photograph that has been cropped. Current methods of minimizing security risks through managing metadata include deleting the metadata of a digital photograph file. Metadata deleted from a photograph file cannot be recovered. While the metadata can pose a security risk, it is also a helpful tool. For example, the metadata that includes a date or GPS location can provide context to a photograph at a later date.

An embodiment of the present invention provides a means to modify the metadata of a digital photograph file while maintaining the original data. The modification of the metadata allows a user to anonymize photograph characteristics. The anonymization allows a user to delete or modify metadata, especially metadata that can pose a safety concern for the user (e.g., identification of the user or people photographed and geo-location data). In one embodiment, metadata is removed or modified within a publicly shared photograph file. Further, the original metadata is maintained in a database, such that the data can be accessed at a later time. The maintenance of the metadata in a database allows a user to share photograph files without a privacy risk while allowing the user to privately access the metadata or reintegrate the original metadata into the photograph file at a later time.

Figure 1:
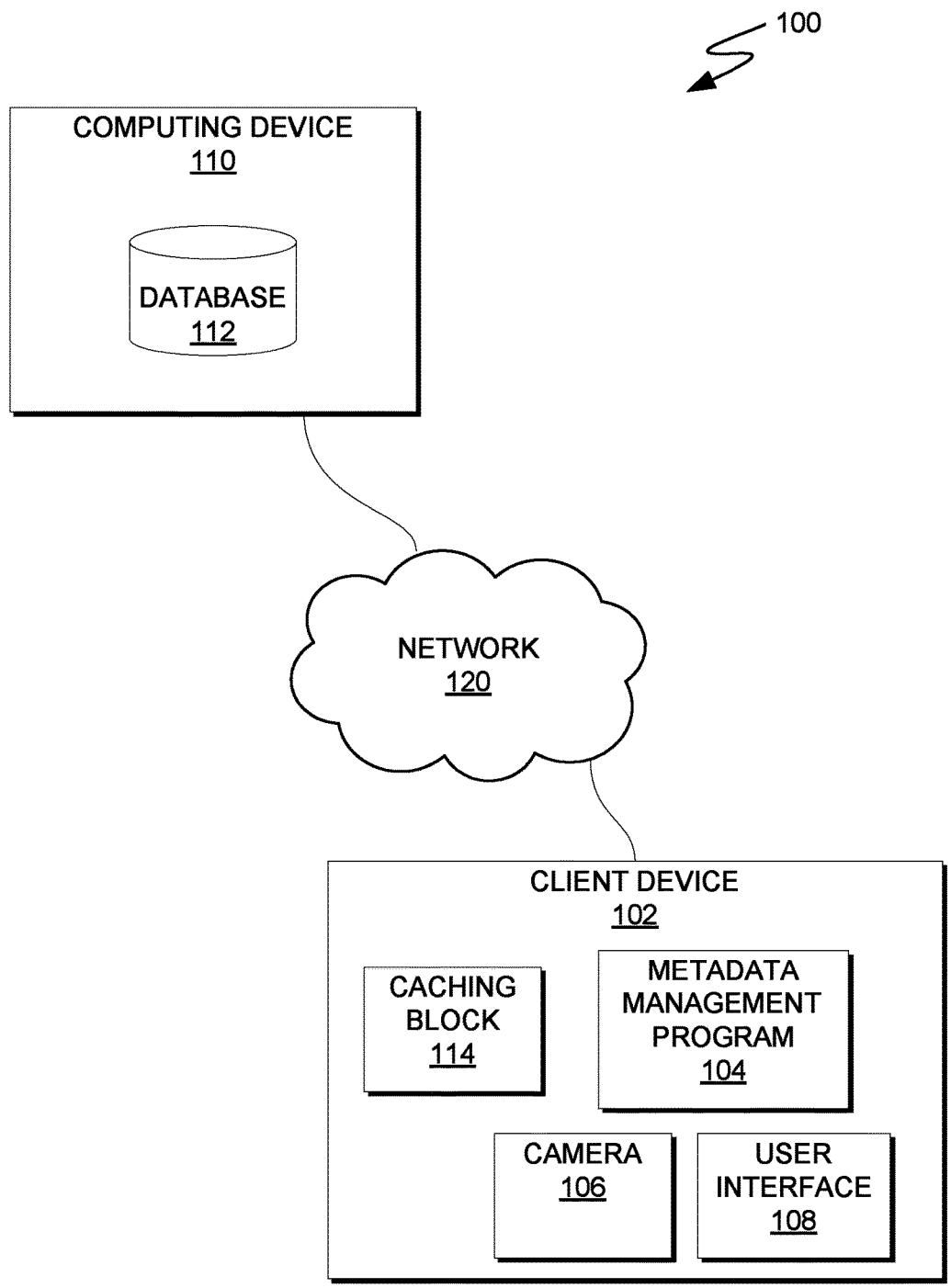
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes client device 102 and computing device 110 connected over network 120. Client device 102 includes metadata management program 104, camera 106, user interface 108, and caching block 114.

In various embodiments, client device 102 is a computing device that can be a standalone device, a server, a laptop computer, a tablet computer, a netbook computer, a personal computer (PC), a smart phone, a mobile computing device, a wearable computing device, or a desktop computer. In another embodiment, client device 102 represents a computing system utilizing clustered computers and components to act as a single pool of seamless resources. In general, client device 102 can be any computing device or a combination of devices with access to computing device 110, and with access to and/or capable of executing metadata management program 104. Client device 102 may include internal and external hardware components, as depicted and described in further detail with respect to FIG. 3.

In one embodiment, metadata management program 104 is stored on client device 102. In some embodiments, metadata management program 104 is integrated into an application on a mobile device (e.g., a camera application on a smart phone). In other embodiments, metadata management program 104 may reside on another computing device, provided that each can access and is accessible by each other of metadata management program 104, camera 106, and user interface 108. In yet other embodiments, metadata management program 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between client device 102 and computing device 110, in accordance with a desired embodiment of the present invention.

In some embodiments, metadata management program 104 is implemented by an open application programming interface (API). The open API allows third party applications to act as metadata management program 104 and access database 112 with user content and authentication. In these embodiments, the open API may replace metadata management program 104 on client device 102. In some embodiments, the open API is a function of a social network.

Metadata management program 104 operates to remove, modify, or add metadata associated with a digital photograph file. Metadata management program 104 can provide operations for any photograph that has a digital photograph file. In some embodiments, metadata management program 104 requires a user authentication. The user authentication can be any method of verification, including a username and a password. The user authentication determines whether a user has permission to access the digital photograph file. In some embodiments, the authentication checks to see if the user is the owner of the photograph file. In other embodiments, a user can give access to view the photograph file to multiple users. In response to authenticating a user, metadata management program 104 allows a user to add, modify, and view the metadata of a digital photograph file.

A user defines what metadata is viewable by the public by providing a rule set via user interface 108. In some embodiments, the digital photograph file has metadata written to the file by camera 106. In one embodiment, metadata management program 104 removes data in response to the rule set. For example, a rule among the rule set states locations (e.g., GPS coordinates) are not shared through metadata. Metadata management program 104 removes the GPS location and other metadata indicating a location. In one embodiment, metadata management program 104 modifies metadata in response to a rule set. For example, a user takes a picture of their new house but does not wish to share the exact location of the house. The user makes a rule that GPS locations be modified to indicate a city center in place of GPS coordinates. In response to receiving the photograph file for the photograph of the house, metadata management program 104 modifies the GPS location of the photograph of the house to indicate the user's hometown city-center. In one embodiment, metadata management program 104 adds metadata to the digital photograph file in response to a rule set indicating a need for more data. For example, a user would like the photographs to be searchable by event. In response, the user adds a rule that writes the name of an event to each photograph file.

Further, metadata management program 104 operates to preserve metadata that is removed from the photograph file. Metadata management program 104 saves the original metadata to database 112 on computing device 110. In some embodiments, metadata modification 104 saves the modified and added metadata to database 112 on computing device 110. The saved metadata is associated with the digital photograph file such that metadata management program 104 recognizes the photograph file after the initial modification by metadata management program 104. Metadata management program 104 retrieves the saved metadata in response to receiving a photograph file a second (or subsequent) time.

Metadata management program 104 operates to create a digital photograph file containing the metadata per the rule set. When a photograph file modified by metadata management program 104 is made public, it contains only the metadata deemed safe for public viewing by the rule set created by the user (e.g., metadata that is original, modified, or added according to the rule set). The public version of the photograph file does not contain the deleted or transformed metadata, nor does it have a traceable link to the deleted metadata. In some embodiments, the public version of the photograph file is uploaded to a social network. Users of the social network can view the metadata as modified by metadata management program 104. In one embodiment, a single photograph file is created by metadata management program 104, but two metadata sets are created. A public metadata set includes original metadata per the rule set, modified metadata, and user added metadata. A private metadata set includes all of metadata originally added by camera 106. The single photograph file contains the public metadata set as modified by metadata management program 104. The private metadata set is accessible by metadata management program 104 in response to receiving a user authentication. In some embodiments, the private metadata set is stored in an encrypted format on database 112, for added security.

Camera 106 operates to capture a photographic image and attach metadata to the digital photograph file. In one embodiment, camera 106 is located on client device 102. In other embodiments, camera 106 is a standalone camera that communicates with client device 106 via network 120. In yet another embodiment, camera 106 is located on another computing device. Camera 106 writes metadata to the digital photograph file. Metadata standards (i.e., what information is documented) vary greatly among cameras. The information camera 106 can record as metadata includes, but is not limited to, GPS location, time stamp, identification of persons in the photograph, camera serial number, copyright information, and contact information for the owner of the photograph file.

Client device 102 includes a user interface (UI), client UI 108, which executes locally on client device 102 and operates to provide a UI to a user of client device 102. Client UI 108 further operates to receive user input from a user via the provided user interface, thereby enabling the user to interact with client device 102. In some embodiments, client UI 108 is a graphical user interface (GUI). In one embodiment, client UI 108 provides a user interface that enables a user of client device 102 to interact with metadata management program 104 of client device 102. In various examples, the user interacts with metadata management program 104 in order to establish rules for the visibility of metadata in publicly shared photograph files. In one embodiment, client UI 108 is stored on client device 102. In other embodiments, client UI 108 is stored on another computing device (e.g., computing device 110), provided that client UI 108 can access and is accessible by at least metadata management program 104 via network 120.

Caching block 114 is a local data repository on client device 102 that can be written to and read by metadata modification program 104. Metadata may be stored to caching block 114. In some embodiments, the private metadata is stored in caching block 114. In other embodiments, both the private and public metadata is stored in caching block 114. In some embodiments, caching block 114 is used for metadata storage when metadata modification program 104 cannot communicate with computing device 110 via network 120. In other embodiments, caching block 114 is used to save a local copy of the metadata.

In various embodiments of the present disclosure, computing device 110 can be a laptop computer, a tablet computer, a netbook computer, a personal computer (PC), a desktop computer, a personal digital assistant (PDA), a smart phone, a cloud computing node or any programmable electronic device capable of communicating with client device 102 via network 120. Computing device 110 includes database 112, which executes locally on computing device 110. Database 112 stores metadata associated with the digital photograph file, including the metadata remaining with the photograph file, metadata removed from the photograph file, and metadata modified or added by metadata management program 104.

Database 112 is a data repository that may be written to and read by metadata management program 104. Metadata may be stored to database 112. In some embodiments, database 112 may be written to and read by programs and entities outside of computing environment 100, including open APIs, in order to populate the repository with digital photograph file metadata.

Figure 2:
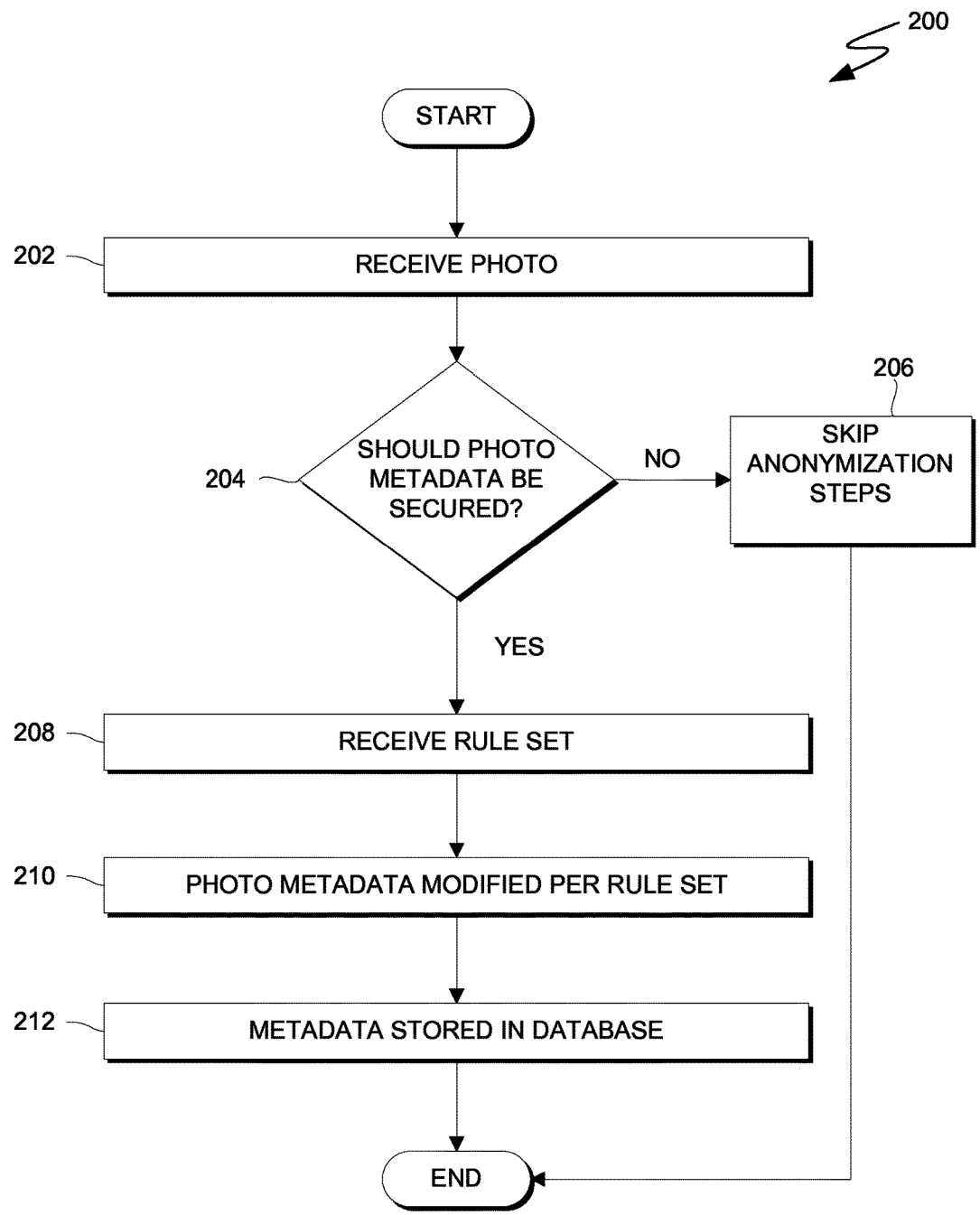
FIG. 2 is a flowchart depicting operations of a metadata modification program on a computing device within the computing environment of FIG. 1, in accordance with an embodiment of the present disclosure.

FIG. 2 is a flowchart depicting operations for modifying the metadata of a digital photograph file, on a computing device within the computing environment of FIG. 1, in accordance with an embodiment of the present disclosure. For example, FIG. 2 is a flowchart depicting operations 200 (i.e., anonymization steps) of metadata management program 104, on computing device 102 within computing environment 100.

In step 202, metadata management program 104 receives a photograph file. In one embodiment, a photograph file is received directly from camera 106 on client device 102. In another embodiment, metadata management program 104 receives a photograph file from a storage device. For example, metadata management program 104 receives a photograph file, captured by another camera, from a file folder on client device 102. In some cases, the photograph file is a photograph file that has been previously received by metadata management program 104. In these cases, the user is able to modify the rule set previously applied to photograph file to change the metadata on the photograph file. In an embodiment where the photograph file is a photograph file previously received by metadata management program 104, in response to receiving the photograph file, metadata management program 104 retrieves the metadata stored in the database.

In some embodiments, metadata management program 104 determines a user authentication prior to receiving a photograph file. The user authentication determines what metadata a user is permitted to view on the photograph file. The user authentication can be any method of checking a user's credentials, including, but not limited to, a username and password.

In decision 204, metadata management program 104 determines whether the metadata should be secured. If metadata management program 104 determines that the photograph file should be secured (decision 204, YES branch), then metadata management program 104 receives a rule set (step 208). In one embodiment, metadata management program 104 determines whether a photograph should be secured based on a user interaction with a prompt. For example, metadata management program 104 prompts a user for security features of one or more captured photographs. In another embodiment, metadata management program 104 determines whether a photograph should be secured based on an initial user setup. For example, a user can establish at setup that only photographs of people are to be secured. In this example, when metadata management program 104 receives a photograph of a landmark, metadata management program 104 determines that the photograph file should not be secured. If metadata management program 104 determines that the photograph file does not need to be secured (e.g., by user prompt or user setup) (decision 206, NO branch), then metadata management program skips the anonymization steps and ends. In step 206, metadata management program 104 maintains the original photograph file metadata on the photograph file.

In step 208, metadata management program 104 receives a rule set. The rule set establishes the metadata that is written to a publicly displayed digital photograph file. The metadata comprises at least one datum related to one or more characteristics of a photograph. For example, the characteristics can include a GPS location, the identification of a landmark, the identification of the photograph owner, the identification of a person in the photograph, a camera serial number, a time stamp, etc. In one embodiment, the rule set includes multiple rules that modify metadata to anonymize one or more of the photograph characteristics. In another rule set, the rule set is a single rule. In one embodiment, the rule set deletes metadata from the photograph file. In some embodiments the rules are binary. For example, a thumbnail photograph retains the original photograph, not the photograph as it has been cropped or edited. In these embodiments, the thumbnail photograph is removed from the public view. In another embodiment, the rule set modifies the metadata on the photograph file. For example, GPS coordinates are modified to identify a city center or other more general places, instead of an exact address of a location. The rule set is both conditional and scalable. For example, where geo-location is used, a user can establish a rule that varies the geo-location modification based on traits of the photograph file metadata (e.g., the metadata of photographs taken within 500 feet of a user's house is transformed to show a GPS location of the city center, whereas the metadata of photographs taken in Las Vegas is transformed to show a GPS location of the center of the U.S.A.). In yet another embodiment, a user adds metadata to the photograph file via the rule set. For example, the user adds a tag to a set of photograph files that identify the event, such as "4$^{th}$ Birthday."

In some embodiments, a user receives a prompt to input the rule set. In these embodiments, the prompt appears in a graphical user interface (GUI), for example, client UI 108. The prompt allows the user to select a rule set for one or more photograph files. For example, the user receives a prompt for each photograph file received, requiring the user to establish a rule set. In some embodiments, the prompt includes an option to apply the rule set to future photograph files received by metadata management program 104, for example, to apply the rule set to photograph files taken at a specified time of day or at a specified location. In another embodiment, a rule set is established before receiving a photograph file. In this embodiment, a user establishes the rule set for received photograph files via options within metadata management program 104, or at set up or initialization of metadata management program 104. In embodiments with a pre-established rule set, the user is able to change the rule set after the photograph file is received by metadata management program 104. For example, a user may select an option for metadata management program 104 to prompt the user for a rule set verification when specified metadata is included with the digital photograph file (e.g., an ID of a person in the photograph or GPS coordinates).

In some embodiments, metadata management program 104 receives rules via a GUI. In these embodiments, metadata management program 104 displays the public view of the digital photograph file in comparison to the original metadata on the GUI. The GUI allows the user to visualize the metadata associated with the photograph file, as it will appear on the publicly published photograph file. In some embodiments, the GUI allows the user to search photograph files located on database 112. For example, the user draws a circle on a map to locate photograph files of photographs taken in a certain geographic area. In another example, the user can search for photograph files by selecting dates on a calendar to find photographs captured during a specific time range. In yet another example, the user can implement multiple GUI search to further limit the search results (e.g., the user can circle an area on a map and select dates on a calendar to limit the number of search results).

In step 210, metadata management program 104 modifies the photograph file metadata per the rule set, creating the public metadata set. Metadata management program 104 modifies metadata from the digital photograph file based on the user-established rules. For example, a user takes a photograph of her child in front of her house. The camera can write metadata to the digital photograph file including the child's name, the GPS location of the house, the camera serial number, the date, and the time. In this example, the user has created a rule set, including, for the safety of the user and child, a rule that deletes the child's name. Another rule in the rule set modifies GPS locations to general city centers. Lastly, the user creates a rule set that adds a tag to the photograph file to identify the photograph was taken on "First Birthday." Based on these rules, metadata management program 104 creates a digital photograph file with metadata that includes City Center, camera serial number, the date, the time, and the tag "First Birthday." In one embodiment, metadata management program 104 includes a default rule set, including, for example, removing the location from the metadata of a photograph file before sharing publicly.

In step 212, metadata management program 104 stores the private metadata in a database. In one embodiment, the metadata written to the digital photograph file is stored on database 112. The storage of the metadata allows a user to recall the data at a later time. For example, the user's rule set required metadata management program 104 to modify GPS locations to city centers. At a later date, the user may want to recall the exact location of the photographed detail. Metadata management program 104 can recall the original metadata from database 112 and replace City Center with the GPS coordinates.

In some embodiments, the photograph file is stored in a database. In other embodiments, the photograph file is stored elsewhere (e.g., caching block 114 of client device 102) and the metadata is stored in database 112. In these embodiments, metadata management program 104 creates an association between the photograph file and the metadata in the database. In some embodiments, metadata management program 104 associates the photograph file and metadata via file name. In other embodiments, metadata management program 104 writes a unique serial ID into the photograph files metadata, to recall the data at a later time. In yet another embodiment, image recognition software is used to associate the photograph file with the metadata. In some embodiments, metadata management program 104 stores the original metadata in database 112. In other embodiments, metadata management program 104 stores original and modified metadata in database 112.

Figure 3:
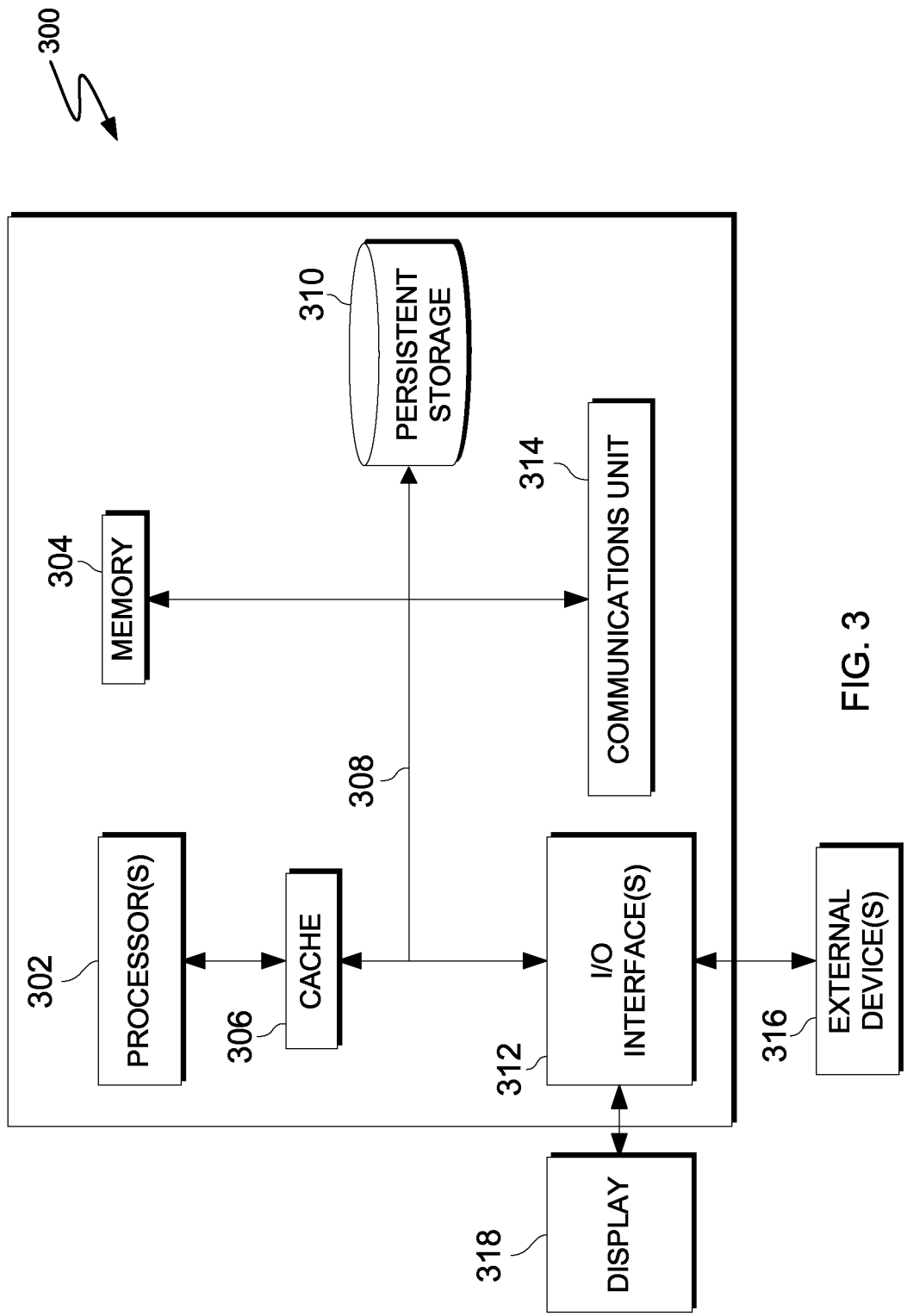
FIG. 3 is a block diagram of components of a computing device executing operations for modifying photograph metadata, in accordance with an embodiment of the present disclosure.

FIG. 3 is a block diagram of components of a computing device, generally designated 300, in accordance with an embodiment of the present disclosure. In one embodiment, computing device 300 is representative of client device 102. For example, FIG. 3 is a block diagram of client device 102 within computing environment 100 executing operations of metadata management program 104.

It should be appreciated that FIG. 3 provides only an illustration of one implementation and does not imply any limitations with regard to the environments in which different embodiments may be implemented. Many modifications to the depicted environment may be made.

Computing device 300 includes communications fabric 308, which provides communications between computer processor(s) 302, memory 304, cache 306, persistent storage 310, communications unit 314, and input/output (I/O) interface(s) 312. Communications fabric 308 can be implemented with any architecture designed for passing data and/or control information between processors (such as microprocessors, communications and network processors, etc.), system memory, peripheral devices, and any other hardware components within a system. For example, communications fabric 308 can be implemented with one or more buses.

Memory 304 and persistent storage 310 are computer-readable storage media. In this embodiment, memory 304 includes random access memory (RAM). In general, memory 304 can include any suitable volatile or non-volatile computer readable storage media. Cache 306 is a fast memory that enhances the performance of processors 302 by holding recently accessed data, and data near recently accessed data, from memory 304.

Program instructions and data used to practice embodiments of the present invention may be stored in persistent storage 310 and in memory 304 for execution by one or more of the respective processors 302 via cache 306. In an embodiment, persistent storage 310 includes a magnetic hard disk drive. Alternatively, or in addition to a magnetic hard disk drive, persistent storage 310 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 310 may also be removable. For example, a removable hard drive may be used for persistent storage 310. Other examples include optical and magnetic disks, thumb drives, and smart cards that are inserted into a drive for transfer onto another computer-readable storage medium that is also part of persistent storage 310.

Communications unit 314, in these examples, provides for communications with other data processing systems or devices, including resources of network 120. In these examples, communications unit 314 includes one or more network interface cards. Communications unit 314 may provide communications through the use of either or both physical and wireless communications links. Program instructions and data used to practice embodiments of the present invention may be downloaded to persistent storage 310 through communications unit 314.

I/O interface(s) 312 allows for input and output of data with other devices that may be connected to computing device 300. For example, I/O interface 312 may provide a connection to external devices 316 such as a keyboard, keypad, a touch screen, and/or some other suitable input device. External devices 316 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 310 via I/O interface(s) 312. I/O interface(s) 312 also connect to a display 318.

Display 318 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

In another embodiment, the invention provides a method that performs the process of the invention on a subscription, advertising, and/or fee basis. That is, a service provider, such as a Solution Integrator, could offer to provide digital photograph anonymization and management. In this case, the service provider can create, maintain, and support, etc., a computer infrastructure, such as computer system 300 (FIG. 3) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for managing photograph metadata anonymization. In this case, a computer infrastructure, such as computer system 300 (FIG. 3), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 300 (FIG. 3), from a computer readable medium; (2) adding one or more computing devices to the computer infrastructure; and (3) incorporating and/or modifying one or more existing systems of the computer infrastructure to enable the computer infrastructure to perform the processes of the invention.

It is understood in advance that although this disclosure may include a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

What is claimed is:

1. A method for managing photograph metadata, the method comprising:
   receiving, by one or more processors, a photograph file, wherein the photograph file comprises a digital photograph and a first set of metadata;
   receiving, by one or more processors, a rule set for modifying the first set of metadata to create a public set of metadata:
   determining, by one or more processors, whether at least one rule of the rule set corresponds to at least one field of the first set of metadata;
   responsive to determining that at least one rule of the rule set corresponds to at least one field of the first set of metadata, modifying, by one or more processors, the at least one field of the first set of metadata based on the rule set to create the public set of metadata with the at least one modified field;
   uploading, by one or more processors, the photograph file with the public set of metadata to a social network; and
   storing, by one or more processors, the first set of metadata in a database as an encrypted private set of metadata.

2. The method of claim 1, wherein the at least one rule of the rule set comprises at least one of (i) deleting a field of the first set of metadata, (ii) modifying a field of the first set of metadata, and (iii) adding a new field to the first set of metadata.

3. The method of claim 1 further comprising:
   authenticating, by one or more processors, a user, wherein the authentication indicates a user permission to access the first set of metadata of the photograph file.

4. The method of claim 1, wherein the first set of metadata includes at least one of: a GPS location, a user identification, one or more names of people in the photograph, a copyright statement, a user contact, a camera serial number, a landmark identification, and a time stamp.

5. The method of claim 1, wherein receiving a rule set is in response to issuing, by one or more processors, a prompt to a user to input one or more rules.

6. The method of claim 1 further comprising:
   displaying, by one or more processors, the photograph file with the public set of metadata.

7. The method of claim 1 further comprising:
   determining, by one or more processors, whether a user updates the rule set, wherein the update includes at least restoring the first set of metadata; and
   responsive to determining a user updated the rule set, displaying, by one or more processors, the photograph file with the first set of metadata, wherein the first set of metadata is retrieved from the database.

8. A computer program product for managing photograph metadata, the computer program product comprising:
   a computer readable storage device and program instructions stored on the computer readable storage device, the program instructions comprising;
   program instructions to receive a photograph file, wherein the photograph file comprises a digital photograph and a first set of metadata;
   program instructions to receive a rule set for modifying the first set of to create a public set of metadata;
   program instructions to determine whether at least one rule of the rule set corresponds to at least one field of the first set of metadata;
   program instructions to modify, responsive to determining that at least one rule of the rule set corresponds to at least one field of the first set of metadata, the at least one field of the first set of metadata based on the rule set to create the public set of metadata with the at least one modified field;
   program instructions to upload the photograph file with the public set of metadata to a social network; and program instructions to store the first set of metadata in a database as an encrypted private set of metadata.

9. The computer program product of claim 8, wherein the at least one rule of the rule set comprises at least one of (i) deleting a field of the first set of metadata, (ii) modifying a field of the first set of metadata, and (iii) adding a new field to the first set of metadata.

10. The computer program product of claim 8 further comprising:
program instructions to authenticate a user, wherein the authentication indicates a user permission to access the first set of metadata of the photograph file.

11. The computer program product of claim 8, wherein the first set of metadata includes at least one of: a GPS location, a user identification, one or more names of people in the photograph, a copyright statement, a user contact, a camera serial number, a landmark identification, and a time stamp.

12. The computer program product of claim 8, wherein receiving a rule set is in response to program instructions to issue a prompt to a user to input one or more rules.

13. The computer program product of claim 8 further comprising:
program instructions to display the photograph file with the public set of metadata.

14. The computer program product of claim 8 further comprising:
program instructions to determine whether a user updates the rule set, wherein the update includes at least restoring the first set of metadata; and
program instructions to display, responsive to determining a user update the rule set, the photograph file with the first set of metadata, wherein the first set of metadata is retrieved from the database.

15. A computer system for managing photograph metadata, the computer system comprising:
one or more computer processors;
one or more computer readable storage media;
program instructions stored on the computer readable storage media for execution by at least one of the one or more processors, the program instructions comprising:
program instructions to receive a photograph file, wherein the photograph file comprises a digital photograph and a first set of metadata;
program instructions to receive a rule set for modifying the first set of metadata to create a public set of metadata;
program instructions to determine whether at least one rule of the rule set corresponds to at least one field of the first set of metadata;
program instructions to modify, responsive to determining that at least one rule of the rule set corresponds to at least one field of the first set of metadata, the field of the first set of metadata based on the rule set to create a public set of metadata with the at least one modified field;
program instructions to upload the photograph file with the public set of metadata to a social network; and
program instructions to store the first set of metadata in a database as an encrypted private set of metadata.

16. The computer system of claim 15, wherein the at least one rule of the rule set comprises at least one of (i) deleting a field of the first set of metadata, (ii) modifying a field of the first set of metadata, and (iii) adding a new field to the first set of metadata.

17. The computer system of claim 15 further comprising:
program instructions to authenticate a user, wherein the authentication indicates a user permission to access the first set of metadata of the photograph file.

18. The computer system of claim 15, wherein the first set of metadata includes at least one of: a GPS location, a user identification, one or more names of people in the photograph, a copyright statement, a user contact, a camera serial number, a landmark identification, and a time stamp.

19. The computer system of claim 15 further comprising:
program instructions to display the photograph file with the public set of metadata.

20. The computer system of claim 15 further comprising:
program instructions to determine whether a user updates the rule set, wherein the update includes at least restoring the first set of metadata; and
program instructions to display, responsive to determining a user update the rule set, the photograph file with the first set of metadata, wherein the first set of metadata is retrieved from the database.

* * * * *